3,322,787
ALPHA-HYDRAZINO-BETA-(3-INDOLYL) ALKANOIC ACID DERIVATIVES
Meyer Sletzinger, North Plainfield, George Gal, Summit, and Edward J. Glamkowski, Plainfield, N.J., assignors to Merck & Co., Inc., Rahway, N.J., a corporation of New Jersey
No Drawing. Filed Sept. 25, 1964, Ser. No. 399,347
4 Claims. (Cl. 260—326.14)

This invention relates to a process for the conversion of indole compounds having a functionally substituted side chain at the 3 position to a new class of anti-inflammatory hydrazino acids. More specifically, it relates to compounds of the formula:

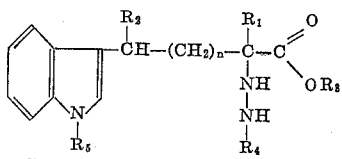

in which $R_1$, $R_2$ and $R_3$ are hydrogen and lower alkyl, $R_4$ is hydrogen, alkanoyl or carbalkoxyl, $R_5$ is hydrogen, acyl (especially lower alkanoyl), alkyl (especially lower alkyl) aralkyl, $n$ is a single integer selected from the series of 0–4, and non-toxic salts of these compounds. It is known that certain $\alpha$-hydrazino-$\beta$-(5-hydroxy-3-indolyl) alkanoic acids and derivatives thereof are potent inhibitors of mammalian decarboxylase.

It has now been found that a new class of $\alpha$-hydrazino-$\beta$-(3-indolyl)alkanoic acids having the formula shown hereinabove are effective as anti-inflammatory agents. The compounds of this invention are prepared from 3-indolyl ketones or aldehydes by the processes shown in Flow Sheet IV or from 3-indolyl-$\alpha$-keto alkanoic acids, or from 3-indolyl-$\alpha$-sulfhydrylacrylic acid, as shown in Flow Sheet V. The starting ketone materials utilized in the process outlined in Flow Sheet IV are prepared by the acylative decarboxylation of 3-indolyl alkanoic acids in accordance with the procedure of Brown, Henbest and Jones, "Journal of the Chemical Society," 3172 (1952), and in accordance with the reaction sequence outlined in Flow Sheet I. The starting aldehyde materials utilized in the process outlined in Flow Sheet IV are prepared from an allyl indole, e.g., a 3-(3'-indolyl)propene-1 by osmium tetroxide oxidation to the corresponding propane-1,2-diol followed by periodate oxidation to the corresponding indolyl acetaldehyde, in accordance with the procedure described in the above-noted Brown et al. "J. Chem. Soc." reference. The reaction sequence is outlined in Flow Sheet II. The starting sulfhydrylacrylic acid compounds are prepared in accordance with the procedure of Gränacher et al., "Helv. Chim. Acta," 7, 575 (1924).

FLOW SHEET I
Synthesis of starting ketone materials

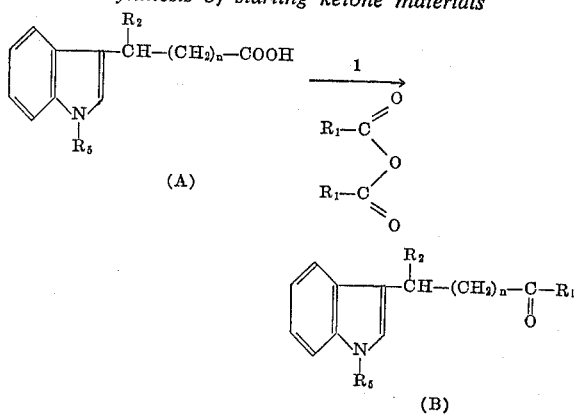

EQUIVALENTS $R_1$=lower alkyl in case of (B);
$R_2$=hydrogen, lower alkyl;
$R_5$=hydrogen, alkyl, aralkyl, acyl;
$n$=0, 1, 2, 3, 4

REAGENTS

A mixture of (A), a freshly-fused sodium salt of a lower alkanoic acid, and a lower alkanoic acid anhydride is heated at 135–140° C. for about 18 hours. The resulting N-acylindolyl ketone is diluted with water and extracted with a mixture of chloroform and ether. The solvent is removed and the ketone distilled under reduced pressure. The N-acylindolyl ketone is hydrolyzed to the 3-indolyl ketone with methanolic sodium hydroxide in dry methanol at about 40° C. for 10 minutes. Following hydrolysis, the solution is solidified and the resulting ketone extracted with ether. The solvent is removed by evaporation to yield the compound of Formula B wherein $R_5$ is hydrogen.

FLOW SHEET II
Synthesis of starting aldehyde materials

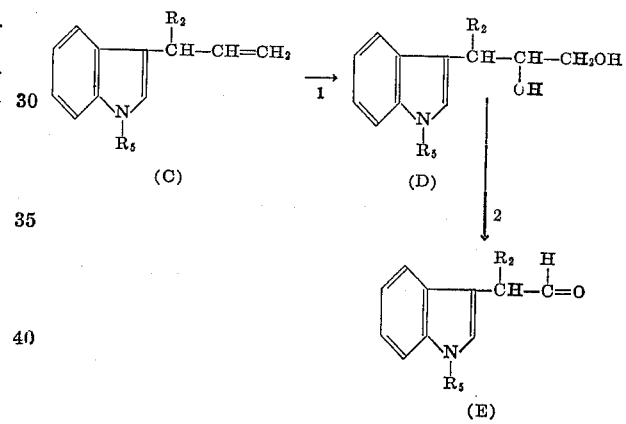

EQUIVALENTS $R_2$=hydrogen, lower alkyl;
$R_5$=hydrogen, alkyl, aralkyl, acyl.

REAGENTS (1) A solution of (C) in pyridine and ether is cooled to about −30° C. and added to a solution of osmium tetroxide and ether also at −30° C. After the solution has warmed to about 15° C., the resulting osmium ester is dissolved in chloroform and agitated with mannitol and potassium hydroxide for about 10 minutes. The aqueous phase is extracted with ether and following evaporation of the ether the resulting gum is triturated with ether and petroleum ether to yield the glycol (D).

(2) A solution of (D) in water is added to a heterogeneous mixture comprising equal parts of an aqueous sodium metaperiodate solution and an equal volume of ether-petroleum ether under a protective atmosphere of nitrogen. Following agitation for about 5 minutes at a temperature of about 15° C., the organic layer containing the product is removed and the aqueous residue extracted with ether. The organic layers are combined and evaporated under reduced pressure to leave substantially pure (E) as the product.

The starting aldehydes and ketones are alternatively prepared by the procedure shown in Flow Sheet III.

FLOW SHEET III
*Synthesis of starting materials*

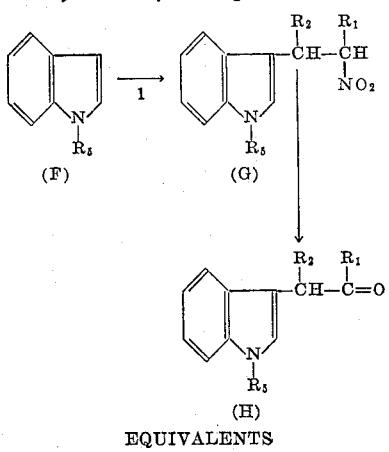

EQUIVALENTS $R_1$ = hydrogen, lower alkyl;
$R_2$ = hydrogen, lower alkyl;
$R_5$ = hydrogen, alkyl, aralkyl, acyl

REAGENTS (1) Addition of a benzene solution of:

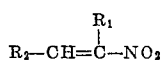

to an agitated benzene solution of the indole at room temperature, followed by evaporation of the solvent. Other inert solvents such as toluene, xylene and ethylbenzene are equally satisfactory.

(2) Addition, dropwise, of a solution of the 3-(2'-nitroalkyl) indole (G) in aqueous sodium hydroxide to an agitated cold dilute sulfuric acid solution, followed by neutralization of the mixture, extraction with chloroform or ether, and evaporation of the dried extract.

In the preparation of the starting material as shown in Flow Sheet I, 3-indolylacetic acid, 2-(3'-indolyl)propionic acid, 2-(3'-indolyl)butyric acid, 2-(3'-indolyl)isobutyric acid, 2-(3'-indolyl)valeric acid, 3-(3'-indolyl)propionic acid, 3-(3'-indolyl)butyric acid, 3-(3'-indolyl)valeric acid, 3-(3'-indolyl)caproic acid, 4-(3'-indolyl)butyric acid, 4-(3'-indolyl)valeric acid, 4-(3'-indolyl)caproic acid, 5-(3'-indolyl)valeric acid, 6-(3'-indolyl)caproic acid or the N-substituted derivatives, are reacted with a lower alkanoic anhydride, and the sodium salt of the corresponding alkanoic acid to produce an indolyl ketone of Formula G. The lower alkanoic anhydrides and the corresponding sodium alkanoates used in this preparation include those derived from acetic acid, propionic acid, butyric acid, isobutyric acid, valeric acid and caproic acid.

In this reaction, when the indole nitrogen of the starting material contains hydrogen as the $R_5$ substituent the resulting product bears an acyl substituent as the $R_5$ substituent corresponding to the alkanoic acid anhydride employed. Where the $R_5$ substituent of the starting material is an acyl substituent, an alkyl substituent, or an aralkyl substituent, the substituent remains through the acylative decarboxylative reaction.

In the preparation of the starting materials, as shown in Flow Sheet III, indole or its 1-methyl, ethyl, propyl, isopropyl, butyl, etc. derivative is reacted with a nitroalkene—

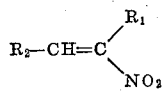

in which $R_1$ and $R_2$ are hydrogen or alkyl. This reaction produces a 3-nitroalkyl indole in which the nitro group is on the second carbon from the indole ring. When this is subjected to the Nef degradation, in which the aci-nitro compound is formed by reaction with alkali and this is then treated with a strong mineral acid, the nitro group and a hydrogen on the same carbon in the nitroalkyl side chain are both eliminated and replaced with a carbonyl oxygen. When $R_1$ is hydrogen, an aldehyde is formed. When $R_1$ is alkyl, the intermediate so formed is a ketone. The nitroalkanes used in this preparation include nitroethylene, 1-nitro-1-propylene, 1-nitro-1-butylene, 1-nitro-1-pentene, 1-nitro-1-hexene, 2-nitro-1-propylene, 2-nitro-1-butylene, 2-nitro-1-pentene, 2-nitro-1-hexene, 2-nitro-2-butylene, 2-nitro-2-pentene, 2-nitro-2-hexene, 3-nitro-2-pentene, 3-nitro-3-hexene, 3-nitro-2-hexene, and the like.

FLOW SHEET IV
*Synthesis of hydrazino acids*

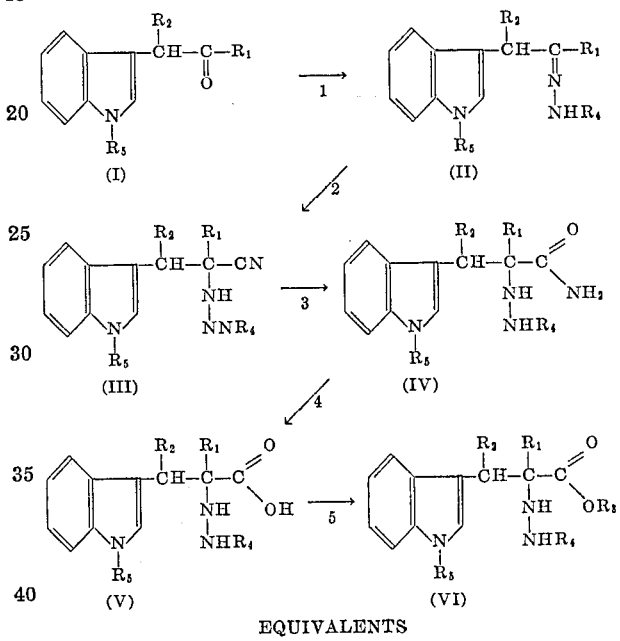

EQUIVALENTS $R_1$ = hydrogen, lower alkyl
$R_2$ = hydrogen, lower alkyl
$R_3$ = hydrogen, lower alkyl
$R_4$ = hydrogen, acyl (preferably lower alkanoyl) carbalkoxy
$R_5$ = hydrogen, alkyl (preferably lower alkyl of from 1–5 carbon atoms), aralkyl (preferably benzyl, phenethyl, halobenzyl), acyl (preferably benzoyl or lower alkanoyl of from 1–5 carbon atoms)

FLOW SHEET V
*Alternate synthesis of hydrazino acids*

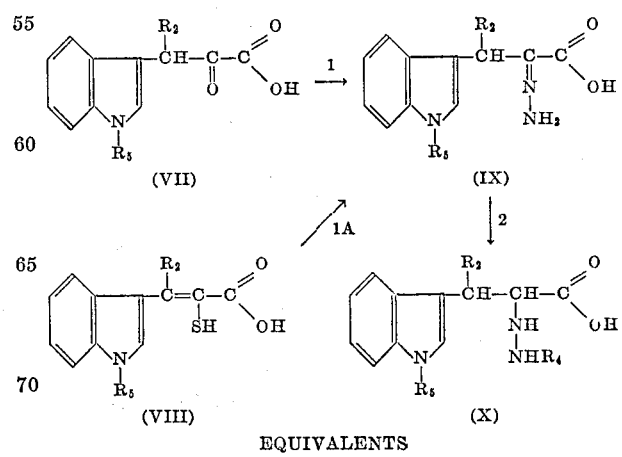

EQUIVALENTS $R_2$ = hydrogen, alkyl
$R_5$ = hydrogen, alkyl, aralkyl, acyl

In accordance with the process of our invention, as outlined in Flow Sheet IV, the starting aldehydes and ketones are reacted with an N-acylhydrazide to form the N-acylhydrazone of the ketone or aldehyde. The formed N-acylhydrazone is then reacted with a source of cyanide ion to form an α-acylhydrazino-β-(3-indolyl)alkanonitrile. The nitrile is converted to the corresponding amide by hydrolysis with a mineral acid. The removal of the N-acyl function and production of the free hydrazino acid in the form of a metal salt is accomplished by hydrolysis with a strong alkali. Adjustment of the alkaline solution with an acid produces the free hydrazino acid as the Zwitterion. Further acidification of the hydrazino acid results in the production of the acid salt.

The starting materials for our process include 3-indolyl acetaldehyde, β-(3-indolyl)propionaldehyde, β-(3-indolyl)butyraldehyde, β-(3-indolyl)valeraldehyde, β-(3-indolyl)caproaldehyde, 3-indolylacetone, 3-(3′-indolyl)butan-2-one, 3-(3′-indolyl)pentan-2-one, 3-(3′-indolyl)hexan-2-one, 4-(3′-indolyl)butan-3-one, 4-(3′-indolyl)pentan-3-one, 4-(3′-indolyl)hexan-3-one, 4-(3′-indolyl)heptan-3-one, 5-(3′-indolyl)hexan-4-one, 5-(3′-indolyl)heptan-4-one, 5-(3′-indolyl)octan-4-one, 4-(3′-indolyl)butan-2-one, 4-(3′-indolyl)pentan-2-one, 4-(3′-indolyl)hexan-2-one, 4-(3′-indolyl)heptan-2-one, 5-(3′-indolyl)heptan-3-one, 5-(3′-indolyl)pentan-2-one, 5-(3′-indolyl)hexan-2-one, 5-(3′-indolyl)heptan-2-one, 6-(3′-indolyl)hexan-2-one, 7-(3′-indolyl)octan-3-one, as well as the N-alkylated, the N-acylated and the N-aralkylated derivatives.

Thus, the starting ketones and aldehydes include N-alkyl derivatives wherein each of the above compounds contains an N-methyl, N-ethyl, N-propyl, N-butyl, N-isopropyl, N-t-butyl, N-pentyl, N-hexyl or an N-heptyl substituent; N-aralkyl derivatives wherein each of the above-listed ketones and aldehydes contains an N-benzyl, N-phenethyl, N-(p-methylbenzyl), N-(o-methylbenzyl), N-(o,p-dimethylbenzyl), N-halobenzyl such as N-(p-chlorobenzyl), N-(p-bromobenzyl), N-(p-trifluoromethylbenzyl), N-(o-chlorobenzyl) and N-(o,p-dichlorobenzyl-N-alkoxybenzyl) such as N-(o-methoxybenzyl), N-(p-methoxybenzyl), N-(o,p-dimethoxybenzyl and N-p-ethoxybenzyl); N-acyl derivatives such as N-benzoyl, N-toluyl, N-(p-chlorobenzoyl), N-acetyl, N-propionyl, N-butyryl, N-valeryl, N-caproyl and N-capryl.

In the first step of our process, the starting ketone or aldehyde dissolved in an organic solvent, preferably a lower alkanol such as methanol, ethanol, propanol or isopropanol, is intimately contacted with a solution of an N-acyl or N-carbalkoxyhydrazide, the hydrazide preferably being present in an excess over that theoretically required in order to ensure complete utilization of the starting carbonyl component. Formation of the hydrazone is accomplished readily at room temperature but it is preferred to heat the reaction mixture to the reflux temperature of the reaction for a brief period, e.g., for about 10 minutes, to accelerate the reaction rate. The reaction is ordinarily carried out under substantially anhydrous conditions. However, small amounts of water may be present in the reaction mixture since the hydrazone precipitates from the reaction mixture as it is formed and thus insures substantially quantitative yield under the conditions employed.

The N-acyl or N-carbalkoxyhydrazone is then contacted with a source of cyanide ion in a liquid diluent for the reactants to form an α-acylhydrazino or α-carbalkoxyhydrazino (3-indolyl)alkanonitrile. In a preferred embodiment of our reaction, the acetylhydrazone of 3-indolylacetone is contacted in solution in dry dimethylsulfoxide with at least an equimolar amount of liquid hydrogen cyanide and a catalytic amount of cyanide ion furnished in the form of potassium cyanide. Under these preferred conditions, the N-acetylhydrazinonitrile of 3-indolylacetone is formed in excellent yield. The solid product is readily obtained by filtration.

The nitrile is then selectively hydrolyzed with a mineral acid to form the corresponding amide. This is readily accomplished in the case of the preferred reactants by stirring the propionitrile compound with an excess of fortified hydrochloric acid at about 0° C. The product is conveniently obtained as the hydrochloride salt by precipitation from the reaction mixture.

The amide is then hydrolyzed to the free acid by hydrolysis with a strong base. In carrying out this hydrolysis reaction, the N-acyl or N-carbalkoxyhydrazino amide is contacted with a solution of an alkali metal hydroxide such as sodium or potassium hydroxide in aqueous ethanol for a period of at least 1 hour. In the course of this hydrolysis, any other N-acyl substituents are hydrolyzed simultaneously. In those starting compounds which contain an N-alkyl or N-aralkyl substituent the N-alkyl or N-aralkyl substituent is unaffected by the conditions of hydrolysis of the amide and, therefore, is present in the final hydrazino acid. Solution of the amide hydrochloride in the aqueous alcoholic alkali is easily accomplished and, to ensure complete hydrolysis, the solution is preferably heated to reflux for a period of about 5–20 hours to form an aqueous solution of the sodium or potassium salt of the α-hydrazino-3-indolylalkanoic acid. Formation of the free hydrazino acid is then accomplished by adjustment of the pH to the iso-electric point of the hydrazino acid by the slow addition of a small amount of an acid. The free hydrazino acid crystallizes from aqueous solution and may be recovered by filtration.

Thus, the new compounds of our invention include α-hydrazino-β-(3-indolyl)propionic acid, α-hydrazino-β-(3-indolyl)butyric acid, α-hydrazino-β-(3-indolyl)valeric acid, α-hydrazino-β-(3-indolylcaproic acid, α-hydrazino-β-(3-indolyl)heptanoic acid, α-hydrazino-α-methyl-β-(3-indolyl)propionic acid, α-hydrazino-α-methyl-β-(3-indolyl)butyric acid, α-hydrazino-α-methyl-β-(3-indolyl)valeric acid, α-hydrazino-α-methyl-β-(3-indolyl)caproic acid, α-ethyl-α-hydrazino-β-(3-indolyl)butyric acid, α-ethyl-α-hydrazino-β-(3-indolyl)valeric acid, α-ethyl-α-hydrazino-β-(3-indolyl)caproic acid, α-hydrazino-α-propyl-β-(3-indolyl)butyric acid, α-hydrazino-α-propyl-β-(3-indolyl)valeric acid, α-hydrazino-α-propyl-β-(3-indolyl)caproic acid, α-hydrazino-α-methyl-γ-(3-indolyl)butyric acid, α-hydrazino-α-methyl-γ-(3-indolyl)valeric acid, α-hydrazino-α-methyl-γ-(3-indolyl)caproic acid, α-hydrazino-α-methyl-γ-(3-indolyl)heptylic acid, α-ethyl-α-hydrazino-γ-(3-indolyl)caproic acid, α-hydrazino-α-methyl-δ-(3-indolyl)valeric acid, α-hydrazino-α-methyl-δ-(3-indolyl)caproic acid, α-hydrazino-α-methyl-δ-(3-indolyl)heptylic acid, α-hydraxino-α-methyl-ε-(3-indolyl)caproic acid and α-hydrazino-α-methyl-ε-heptylic acid.

The resulting α-hydrazino-(3-indolyl)alkanoic acids are readily converted to the N-acylated compounds by heating the hydrazino acid with the proper alkanoic anhydride in the presence of a proton acceptor such as pyridine, picoline or dimethylaniline. Lower alkanoic anhydrides which can be used include acetic anhydride, propionic anhydride, butyric anhydride, and the like. Formylation is carried out with a formic acetic anhydride. The N-carbalkoxy derivatives are prepared by reaction of the free hydrazino acid with an orthoformate compound such as ethylchloroformate, propylchloroformate, and the like.

In the case of the starting aldehydes and ketones which contain an N-alkyl or an N-aralkyl substituent, the resulting acylated compounds will contain an N-acyl substituent attached to the hydrazine nitrogen. In the case of the starting aldehydes or ketones which contain an N-acyl substituent attached to the indole nitrogen, the acyl substituent is hydrolyzed simultaneously with the hydrolysis of the amide to the free hydrazino acid.

The esters of either the N,N-acyl derivatives of the hydrazino indolyl alkanoic acids or the free hydrazino indolyl alkanoic acids are readily prepared by esterification of the carboxyl group of the hydrazino acid with a lower alkanol in the presence of a strong acid such as sulfuric acid, hydrochloric acid, and the like. Thus, the hydrazino or the N-acylhydrazino acids of our invention are readily converted to the corresponding methyl, ethyl, propyl, butyl and other lower alkyl esters by heating the hydrazino acid or the N-acylhydrazino acid with the corresponding lower alkanol in the presence of a strong acid, for example, a strong mineral acid such as hydrochloric acid or sulfuric acid or a strong organic acid such as trifluoroacetic acid, p-toluenesulfonic acid or p-nitrobenzenesulfonic acid under substantially anhydrous conditions.

In accordance with an alternate method of preparing certain of the α-hydrazino-β-indolylalkanoic acids, i.e., those bearing a hydrogen substituent on the hydrazino carbon, the known α-keto-β-(3-indolyl)alkanoic acids are converted by reaction with hydrazine to the corresponding α-hydrazone and, subsequently, by reduction, to the α-hydrazino-β-(3-indolyl)alkanoic acid. In the first step of this alternate process, a solution of an α-keto-β-(3-indolyl)alkanoic acid in a low molecular weight organic solvent, e.g., a lower alkanol such as methanol, ethanol, isopropanol and the like, is mixed with a molar excess of hydrazine, preferably in the form of its hydrate, to form the corresponding hydrazone. The hydrazone forms readily in excellent yield, and the resulting crystalline product is recovered by filtration.

The hydrazone is then reduced to the corresponding hydrazino acid. In a preferred method of operation, this is accomplished by contacting the hydrazine salt of the hydrazone compound in aqueous solution with sodium amalgam to reduce the carbon-nitrogen double bond and form an α-hydrazino substituent. Following the reduction, the aqueous phase of the reaction containing the product α-hydrazino acid is separated from the mercury and the hydrazino acid precipitated by adjustment of the pH of the filtrate to the iso-electric point.

The esters of both types are especially useful in that one obtains much better absorption of the compound in the body and much more prolonged activity with smaller and less frequent dosage. The carbalkoxy esters, especially, can be used in the form of non-toxic salts such as the hydrobromide, hydrochloride, sulfate and the like. These salts are water-soluble and are formed in the preparation of the ester. If the free hydrazino ester is desired, it is obtained by basification of the salt. It, too, can be used therapeutically.

The compounds of this invention may be associated with a carrier which may be either a solid material or a sterile parenteral liquid. The composition may take the form of tablets, powder, capsules or other dosage forms which are particularly useful for oral ingestion. Liquid diluents are employed in sterile condition for parental use. In general, the free acids among the compounds of our invention are given in dosages of 10–350 mg./kg. per day. Preferably, they are used orally, in the range of 50–150 mg./kg. per day, preferably in frequent small doses, although they may also be given as infrequently as twice a day.

Our invention can be illustrated by the following examples.

EXAMPLE 1

Acetylhydrazone of 3-indolylacetone

A slurry of 6.92 g. (0.04 mole) of 3-indolylacetone in 15 ml. of absolute methanol is contacted with a solution of 5.92 g. (0.08 mole) of N-acetylhydrazide in 10 ml. of absolute methanol. The reaction mixture is then stirred and heated at the reflux temperature for about 10 minutes and then allowed to cool to about 25° C., whereupon the product separates as a crystalline solid. The reaction mixture is cooled to about 0° C. to ensure complete precipitation of the product, and the product is recovered by filtration, washed with methanol, ether and petroleum ether, and dried. M.P. 218–220° C.

U.V. IN ETHANOL

| λ max.: | E percent |
|---|---|
| 2910 | 258 |
| 2810 | 308 |
| 2730 | 307 |
| 2210 | 1909 |

Following the procedures described above and utilizing the ketone starting materials listed at col. 5 of the specification in a molar ratio of 1 mole of starting ketone to 2 moles of N-acetylhydrazide, the hydrazone of the corresponding ketone is formed.

EXAMPLE 2

Carbethoxyhydrazone of 3-indolylacetone

To a mixture of 3.46 g. (0.02 mole) of 3-indolylacetone and 7 ml. absolute methanol is added, with stirring, a solution of 4.16 g. (0.04 mole) of carbethoxyhydrazide in 5 ml. absolute methanol. The stirred mixture is heated at the reflux temperature for about 10 minutes and then gradually cooled to room temperature. The formed product is recovered by chilling the entire reaction mixture to about 0–5° C. for approximately 30 minutes to ensure complete precipitation of the carbethoxyhydrazone of 3-indolylacetone. The precipitated crystalline product is recovered by filtration and washed with methanol ether and petroleum ether successively. The product, after drying in vacuo is substantially pure.

EXAMPLE 3

α-Acetylhydrazino-β-(3-indolyl)-α-methylpropionitrile

A mixture of 25 g. (0.109 mole) of 3-indolylacetone acetylhydrazone, 200 ml. dry dimethylsulfoxide, approximately 50 mg. of potassium cyanide and 10.33 g. (0.38 mole) of liquid hydrogen cyanide is prepared in a tightly-stoppered reaction vessel. The mixture is stirred and the acetylhydrazone is slowly dissolved as it is converted to the soluble product. After a period of about 24 hours the solution is concentrated. The solvents are removed by evaporation to leave the product as a residual oil. This oil is triturated with ether and dissolved in dioxane, which is passed through a column of acid-washed alumina, dioxane being used as the eluent for the column. The yellow-colored eluted fractions are combined and concentrated under reduced pressure to a constant weight. The residual oil comprising the desired product is crystallized from a mixture of isopropanol ether and petroleum ether and the white crystalline solid product is recovered by filtration and washed with ether and dried. M.P. 134–136° C.

U.V. IN ETHANOL

| λ max.: | E percent |
|---|---|
| 2900 | 214 |
| 2820 | 247 |
| 2740 | 230 |
| 2200 | 1530 |

The procedure is repeated using as starting materials each of the hydrazones formed in Examples 1 and 2 and the corresponding α-acyl or α-carbolkoxyhydrazino nitrile is formed.

EXAMPLE 4

α-Acetylhydrazino-α-methyl-β-(3-indoyl)propionamide hydrochloride

A solution is prepared by mixing 1.024 g. (0.004 mole) of α-methyl-α-acetylhydrazino-β-(3-indolyl)propionitrile and 15 ml. of fortified hydrochloric acid at 0° C. The resulting solution is maintained at 0° C. for a period of about 19 hours. The excess hydrogen chloride is removed from the reaction mixture by bubbling nitrogen gas through the cooled solution of the product and the solution then concentrated under reduced pressure at a room temperature of about 25° C. to precipitate the product in crystalline form. The entire reaction mixture is diluted with 10 ml. of acetone and the crystalline amide is recovered as the hemihydrate of the hydrochloride salt by filtration, washed with acetone and ether and dried. M.P. 207–208° C.

U.V. IN ETHANOL

λ max.: | E percent
--- | ---
2910 | 166
2825 | 192
2760 SHD | 179
2210 | 1131

The procedure is repeated using as starting materials appropriate molecular proportions of the hydrazino nitriles formed in accordance with Examples 3 and the corresponding α-acyl or α-carbalkoxyhydrazino alkanoic acid amide is formed.

EXAMPLE 5

*α-Hydrazino-α-methyl-β-indolylpropionic acid*

A solution is prepared by mixing 4.0 g. (0.0125 mole) of α-acetylhydrazino-α-methyl-β-(3-indolyl)propionamide hydrochloride hemihydrate, 16 ml. of 40% aqueous potassium hydroxide and 8 ml. of ethanol. The solution is then heated at the reflux temperature under nitrogen gas for a period of about 18 hours to produce the product hydrazino acid. The hot solution containing the potassium salt of α-hydrazino-α-methyl-β-indolylpropionic acid is evaporated under reduced pressure to about one-half the original volume. The solution is then filtered to remove a small amount of solid impurity which separates during the evaporation. The filtrate containing the product is then cooled to about 0° C. and the pH adjusted to approximately 5.4 by the slow addition of glacial acetic acid, at which point the crude product precipitates and is recovered by filtration, washed with water and dried. M.P. 185–195° C. The crude product is then purified by dissolving in 5 ml. of 2.5 N-hydrochloric acid decolorized with charcoal and the solution containing the product filtered to remove the charcoal. The filtrate containing the product is then treated with 3.0 ml. of a 50% aqueous sodium acetate solution to crystallize the Zwitterion of the hydrazino acid. The solution is cooled to ensure complete precipitation of the product which is then recovered by filtration, washed with water and dried. M.P. 202° dec.

U.V. IN 1 N HCl

λ max. | E percent
--- | ---
2875 | 199
2790 | 243
2730 SHD | 232
2175 | 1503

Rf=0.69. Single brown spot as the hydrochloride on whatman No. 4 paper, eluted with 5:1:4 n-BuOH:AcOH:H$_2$0 when sprayed with Ehrlich reagent.

The procedure is repeated using as alternate starting material the acetyl or carbalkoxyhydrazino alkanoic acid amides produced in accordance with Example 4 and the corresponding hydrazinoalkanoic acids are formed.

The sodium salts of the acids produced in accordance with the above procedure are produced by reaction with an alcoholic solution containing 1 mole of sodium ethoxide per mole of hydrazino acid used.

The ethyl esters of the above acids are formed by heating a solution of the above acid in ethanol with a small amount of concentrated sulfuric acid. The propyl and butyl esters are formed in the same manner by substitution of propanol and butanol for ethanol in the esterification procedure.

EXAMPLE 6

*Indole-3-pyruvic acid hydrazone*

To a slurry of 40.6 g. (0.2 mole) of indo-3-pyruvic acid in 300 ml. of ethanol is added 35.0 g. (0.7 mole) of hydrazine hydrate to form a red-colored solution. The solution is cooled to 0° C. and maintained at that temperature for a period of 1 hour, whereupon the product crystallizes as the hydrazine salt and is recovered by filtration, washed with cooled ethanol and dried. M.P. 156° C. The free acid is obtained by careful neutralization with acid.

EXAMPLE 7

*Indole-3-pyruvic acid hydrazone*

To 1.97 g. (0.009 mole) of β-(3-indolyl)-α-sulfhydrylacrylic acid in 7 ml. of absolute ethanol is added 2.40 ml. (.048 mole) of hydrazine hydrate. The mixture is stirred and heated to the reflux temperature with a protective layer of nitrogen gas for about 2 hours during which time hydrogen sulfide gas is evolved. After the 2-hour period, the evolution of hydrogen sulfide ceases. The product, which crystallizes as the hydrazine salt from solution during the course of the reaction is recovered by filtration, washed with cooled absolute ethanol and dried in vacuo at 50° C. M.P. 156° C.

EXAMPLE 8

*α-Hydrazino-β-(3-indolyl)propionic acid*

A mixture of 300 ml. of water and 33.0 g. of the hydrazine salt of indolyl-3-pyruvic acid hydrazone is contacted with 92.0 g. of 2.3% sodium amalgam, the amalgam being added slowly over a 1-hour period, the reaction mixture being protected by a blanket of nitrogen gas. The reaction mixture is then stirred for approximately 80 hours at 25° C. The aqueous phase containing the product is then separated from the amalgam by decantation and treated with 3.0 g. of decolorizing charcoal. The charcoal is removed by filtration and the pH of the filtrate containing the product is adjusted to 5.5 by the addition of acetic acid to precipitate the product as a solid, which is recovered by filtration and washed with water.

The white solid is then slurried in 200 ml. of water and dilute (1:1) hydrochloric acid is added to a pH of 1.2. The solution which contains the product in the form of a hydrochloride is filtered to remove any undissolved impurity and an aqueous acetate solution (15 g. sodium acetate in 40 ml. of water) is added, whereupon the product precipitates as a white solid and is recovered by filtration, washed with water and ethanol and dried. M.P. 260° C. (decomposition).

U.V. IN 1 N HCl

λ max.: | E percent
--- | ---
2875 | 221
2970 | 267
2725 SHD | 257
2180 | 1722

Various changes and modifications of the invention can be made, and to the extent that such variations incorporate the spirit of this invention, they are intended to be included within the scope of the appended claims.

What is claimed is:

1. α-Hydrazino-β-(3-indolyl)propionic acid.
2. α-Hydrazino-β-(3-indolyl)propionic acid hydrochloride.
3. The ethyl ester of α-hydrazino-β-(3-indolyl)propionic acid.
4. A compound selected from the group consisting of (1) compounds of the formula:

$$\begin{array}{c} R_2 \ \ R_1 \ \ \ \ O \\ | \ \ \ \ | \ \ \ \ \parallel \\ \text{—CH—C—C} \\ | \ \ \ \ \ \ \ \ \ \setminus \\ NH \ \ \ \ \ OR_3 \\ | \\ NH \\ | \\ R_4 \end{array}$$

wherein R$_1$ is hydrogen; R$_2$ and R$_3$ are each selected from the group consisting of hydrogen and lower alkyl; R$_4$ is selected from the group consisting of hydrogen, lower alkanoyl and carb(lower)alkoxy; and $R_5$ is selected from the group consisting of hydrogen, lower alkyl, lower alkanoyl, benzoyl, chlorobenzoyl, toluyl, benzyl, phenethyl, halobenzyl, lower alkylbenzyl and loweralkoxybenzyl; and (2) non-toxic salts of the above compounds.

References Cited

UNITED STATES PATENTS

| | | | |
|---|---|---|---|
| 2,947,758 | 8/1960 | Robinson | 260—319 |
| 3,075,993 | 1/1963 | Chemerda et al. | 260—319 |

FOREIGN PATENTS 615,395   9/1962   Belgium.

OTHER REFERENCES

Migrdichian, Organic Synthesis, vol. 1, Reinhold Publishing Corp., New York, 1957, pages 153–154.

ALEX MAZEL, *Primary Examiner.*

MARY U. O'BRIEN, *Assistant Examiner.*